Patented Mar. 22, 1932                                              1,850,513

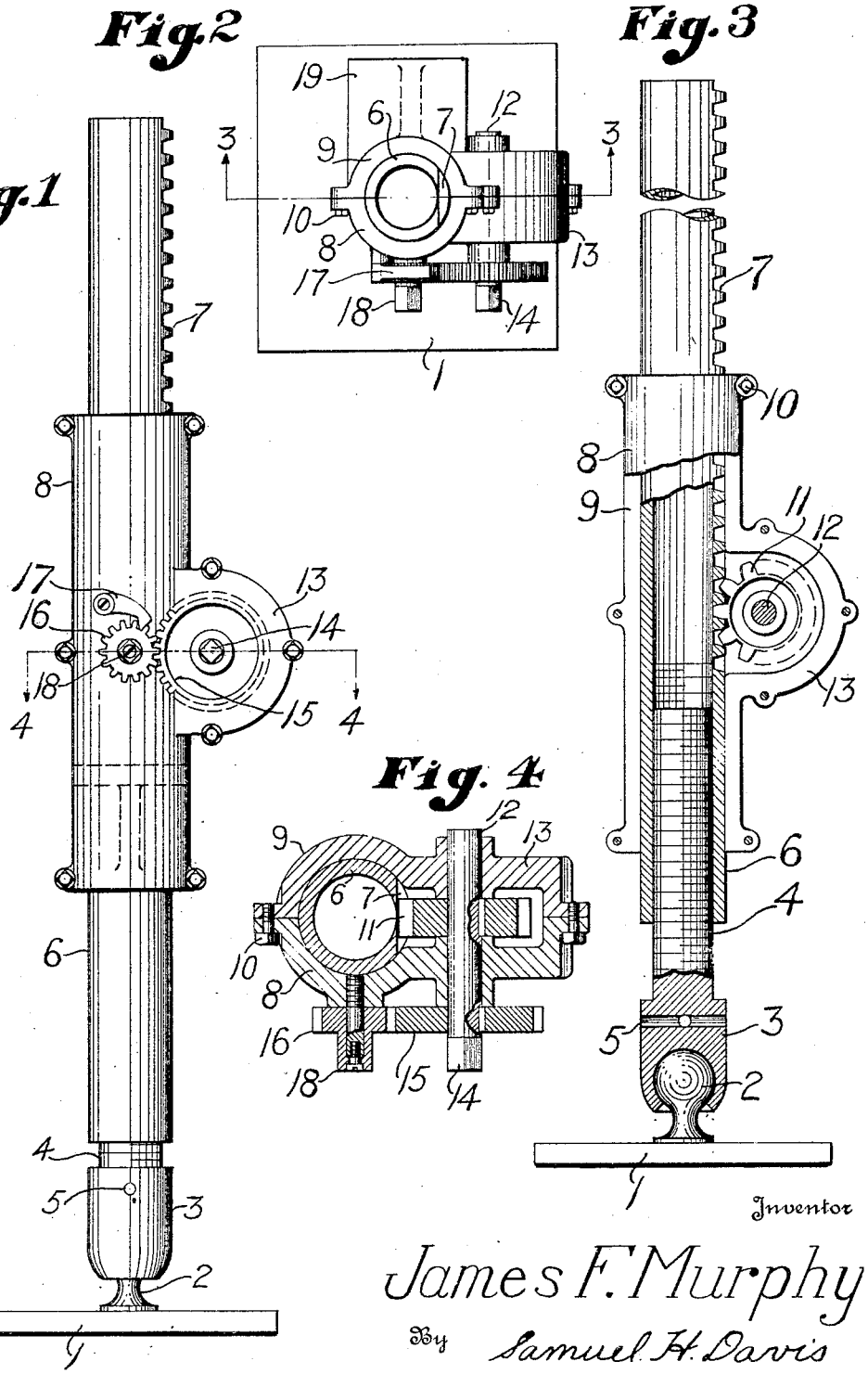

UNITED STATES PATENT OFFICE

JAMES F. MURPHY, OF LANSING, MICHIGAN, ASSIGNOR OF ONE-HALF TO JOSEPH W. GLEASON, OF LANSING, MICHIGAN

RACK AND GEAR JACK

Application filed June 23, 1931. Serial No. 546,351.

This invention relates to rack and gear jacks, and is intended to be applicable to any lifting operations where heavy bodies are to be raised by hand.

This invention has for its object the production of a tool or appliance of the nature stated which combines in its structure and operation both lever and screw action, and comprises parts of special construction and disposition which are believed to be especially easy to manufacture and assemble and which are of unusual strength and cannot get out of order.

In the accompanying drawings the preferred forms of the various parts and their combination and relations are illustrated. Fig. 1 represents a side view. Fig. 2 is a top view. Fig. 3 is partly a vertical sectional view taken in the plane indicated by line 3—3 of Fig. 2, and partly in side elevation. Fig. 4 is a transverse section taken in the plane indicated by the line 4—4 of Fig. 1.

Throughout the drawings and description the same member is used to refer to the same part.

Considering the drawings, a base 1 has erected thereon a ball 2 which constitutes a ball and socket joint in connection with the butt 3 of a vertical post 4. The butt of the post has holes 5 for the insertion of a bar when desired to turn the post which is revoluble about a vertical axis.

The post 4 carries a tubular member 6 with which the post is in screw threaded engagement as shown. The tubular member has formed therein a vertical series of teeth 7. About the tubular member is a sleeve comprising usually two halves 8 and 9 secured together by bolts 10. The sleeve carries a gear 11 in mesh with the teeth 7 of the tubular member, and the gear is secured upon a shaft 12 passing transversely through a side housing 13 formed by the association of the sides of the sleeve. Outside the housing the shaft 12 has the gear 15, and the end of the shaft 14 is squared for the reception of a crank socket not shown. Engaging gear 15 is a relatively small gear 16 carried rotatively on the side of the sleeve and formed with a raised and squared center 18 for the reception of a crank socket. Also pivotally borne by the sleeve is a pawl 17 engaging the small gear.

As best shown in Fig. 2 one of the parts or halves of the external sleeve is provided with a load bearing extension 19.

It is not intended to confine this invention to the precise forms, or shapes of the parts set forth, and the same may be made of any size individually strengthened when desired for any particular and severe usage.

In the operation, as the parts are illustrated, a great amount of leverage can be applied to the small gear and thus to the other gears and to the teeth of the tubular member, the reaction of such force raising the sleeve and load extension. If after the loaded sleeve has been raised by the gear action, it is desired to raise or lower the same slightly, a bar, not shown, may be inserted in the holes 5 and by screw action the tubular member may be raised or lowered on the post.

Having now described this invention and the manner of its use, I claim:—

1. In a rack and gear jack, the combination with a post, of a base therefor, the said post being axially revoluble, a tubular member having gear teeth formed in one side in a vertical series, said post and tube having mutually engaging threaded portions, an external sleeve having a load bearing extension and movable up and down on the tubular member, said sleeve having a side housing, a gear in said housing meshing with the teeth of the tubular member, a shaft secured to the said gear and passing through the said housing and having a squared end, and ratchet devices arranged to hold the said shaft from turning when the said extension of the sleeve is loaded.

2. In a rack and gear jack, the combination with a post, of a base therefor, the said post being axially revoluble, a tubular member having gear teeth formed in one side in vertical series, said post and tube having mutually engaging threaded portions, an external sleeve comprising two halves secured together upon said tubular member, one of the said parts of the sleeve having a load bearing extension, the said sleeve being movable up and down upon the tubular member, said sleeve having a side housing, a gear in the said housing meshing with the teeth of the said tubular member, a shaft secured to said gear and passing through the said housing and having a squared end, and ratchet devices arranged to hold said shaft from turning when the said extension of the sleeve is loaded.

3. In a rack and gear jack, the combination with a post, of a base therefor, the said post being axially revoluble, a tubular member having gear teeth formed in one side in vertical series, said post and tube having mutually engaging threaded portions, an external sleeve comprising parts secured together upon the said tubular member, one of the said parts of the sleeve having a load bearing extension, the said sleeve being movable up and down upon the tubular member, said sleeve having a side housing, a gear in the said housing meshing with the teeth of the said tubular member, a shaft secured to said gear and passing through the said housing, and ratchet devices arranged to hold the said shaft from turning when the said extension of the sleeve is loaded and comprising an outside gear on the said shaft, a relatively small gear on the said sleeve and having a squared projecting center and in engagement with the said outside gear, and a pawl carried by the sleeve in engagement with the said small gear.

In testimony whereof, I affix my signature.

JAMES F. MURPHY.